United States Patent Office 3,809,612
Patented May 7, 1974

3,809,612
PROCESS FOR THE PRODUCTION OF CITRIC ACID BY SUBMERGED FERMENTATION
Adel J. Kabil, Vienna, Austria, assignor to Aktiengesellschaft Jungbunzlauer Spiritus- und Chemische Fabrik, Vienna, Austria
No Drawing. Filed Aug. 23, 1971, Ser. No. 174,152
Claims priority, application Austria, Aug. 21, 1970, A 7,632/70
Int. Cl. C12d 1/04
U.S. Cl. 195—36 R  12 Claims

ABSTRACT OF THE DISCLOSURE

A process for the production of citric acid by submerged fermentation of carbohydrate-containing material by means of the fungus *Aspergillus niger* is disclosed. The process, which is carried out in a nutrient medium containing alkali ions and phosphate ions, involves adjusting the weight ratio of alkali ions to phosphate ions to a value of 1.01 to 3.42:1 by adding sodium chloride to the fermentation medium in an amount such that the weight ratio of sodium ions to potassium ions is 1.46 to 7.30:1.

---

The invention relates to a process for the production of citric acid by submerged fermentation of carbohydrate-containing material by means of the mould *Aspergillus niger* in a nutrient medium containing alkali ions and phosphate ions.

The alkali ions usually contained in nutrient media are potassium ions which as a rule are introduced in the form of $KH_2PO_4$, very rarely also in the form of KCl.

It is known, in order to suppress the undesirable secondary reaction occurring with the production of citric acid, that of the formation of oxalic acid, to maintain a weight ratio between alkali metal and phosphate of less than about 0.83 and a pH value of the fermentation medium of less than about 2.0. Oxalic acid production is to be suppressed because feedstuffs in which the presence of oxalic acid is undesirable are won from the residues of citric acid-fermentation, that is to say, the mycelium filtered off from the fermentation broth and the solution remaining after precipitation of the citrate.

Independently of this, it was observed that wetting agents added to the fermentation solution before inoculation cause undesirable foaming. But the wetting agents are necessary for the intimate contact of the spore mass with the fermentation solution.

It is the object of the present invention to reduce this undesirable foaming and to shorten the fermentation period.

According to the invention, this is achieved in a process of the type initially mentioned by adjusting the weight ratio of alkali ions:$PO_4$ ions to a value of 1.01 to 3.42:1 by adding to the fermentation medium sodium chloride in such an amount that the weight ratio of sodium ions to potassium ions is 1.46 to 7.30:1.

A noticeable influence on oxalic acid production by the addition of sodium chloride to the fermentation solution cannot be detected.

The addition of sodium chloride is advantageously done in such a manner that part of the sodium chloride is added with the spore suspension of *Aspergillus niger* and the other part of it is added directly to the fermentation solution. This can be of advantage, e.g., in those cases where the spore suspension contains NaCl.

It has proven favorable to effect fermentation in the presence of stainless steel of the type DIN 4586 and 4505, respectively, whereby the contact of the metal with the nutrient solution is effected by the construction of parts or of all of the fermenter, of pipes or of cooling coils of stainless steel or by the introduction of a piece of steel into the nutrient solution. By this addition of stainless steel, an especially favorable ratio of the trace metal-ion-concentration is adjusted in the fermentation solution, which leads to increased yields.

As an inhibitor suitable for inhibition of mycelium growth $K_4[Fe(Cn)_6] \cdot 3H_2O$ is added in amounts of 0.05 to 10 p.p.m. The inhibitor can be added with the inoculation or after it and during fermentation if this seems necessary according to microscopic observation. By the measure, the desired inhibitor of mycelium growth leading to increased production of critic acid is achieved.

According to a preferred embodiment, fermentation is carried out in the presence of nitrogen-containing compounds, preferably in the presence of compounds containing ammonium ions, with the compounds containing nitrogen, preferably ammonium ions, being added 24–36 hours, preferably 30 hours, after inoculation. This measure also leads to increased yields.

It is also of advantage to proceed so that the nutrient medium is adjusted to a pH value of 2.9. By the adjustment of this low pH value, the production of foreign acids during fermentation is reduced to a minimum.

Similarly favorable results are obtained by replacing the compound containing ammonium ions by caustic soda. The first addition of caustic soda is effected 24–36, preferably 30 hours after inoculation, and further additions are made in small portions or doses.

EXAMPLE 1

A decationized sugar solution with a content of 25.2% per weight volume was sterilized in streaming steam for 30 minutes and then cooled off to 35° C.

Six sterile tower fermenters of pilot plant type of glass with a diameter of 150 mm. and a height of 1000 mm. were filled with 11 liters each of the above solution and this was adjusted to a temperature of 30° C. Each fermenter contained a piece of stainless steel of the type DIN 4586. The aerated sugar solution was charged with the following nutrient salts:

|  | G. |
|---|---|
| $KH_2PO_4$/l. | 0.15 |
| $MgSO_4 \cdot 7H_2O$/l. | 1.1 |
| $CaCl_2 \cdot 2H_2O$/l. | 0.55 |
| $ZnSO_4 \cdot 7H_2O$/l. | 0.0015 |

After pH value adjustment to 2.90 and addition of the inhibitor, inoculation with spores of *Aspergillus niger* was effected. A temperature of 30° C. was maintained during the entire fermentation period.

Three of the towers, in addition to this, contained 0.20 g. NaCl per liter. Next to the citric acid formed and the fermentation yield, the consumption of defoaming agent was also recorded. The fermentation results are evident from the following table:

TABLE 1

| Fermentation test No. | Addition of NaCl, g./l. | Fermentation period in days | Citric acid monohydrate, grams | Yield in percent | Consumption o defoaming agent (ml.) |
|---|---|---|---|---|---|
| 106 | | 12 | 2,320 | 83.7 | 2$\frac{2}{3}$ |
| 107 | | 12 | 2,299 | 82.9 | 2$\frac{5}{2}$ |
| 108 | | 11 | 2,318 | 83.6 | 2$\frac{2}{2}$ |
| 109 | 0.2 | 9 | 2,456 | 88.6 | 1$\frac{3}{2}$ |
| 110 | 0.2 | 9 | 2,501 | 90.2 | 1$\frac{2}{2}$ |
| 111 | 0.2 | 9½ | 2,483 | 89.6 | 1$^2$ |

As obvious from the above table, the addition of sodium chloride not only increases the fermentation yield, but also clearly shortens the fermentation period and reduces the consumption of defoaming agent.

EXAMPLE 2

The same procedure as described in Example 1 was followed, with the exception that the towers also contained 0.20 g. NaCl per liter, but fermentation took place in the presence of caustic soda, optionally in the form of a solution, the addition being effected in doses.

TABLE 2

| Fermentation test No. | Addition of NaCl, g./l. | Fermentation period in days | Citric acid monohydrate, grams | Yield in percent | Consumption of defoaming agent (ml.) |
|---|---|---|---|---|---|
| 112 | 0.2 | 9½ | 2,475 | 89.3 | 13 |
| 113 | 0.2 | 10 | 2,414 | 87.1 | 12 |
| 114 | 0.2 | 9 | 2,489 | 89.8 | 12 |

What is claimed is:

1. In a process for the production of citric acid, comprising submerged fermentation of carbohydrate-containing material by means of the fungus *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ions is 1.46 to 7.30:1.

2. The process according to claim 1 wherein part of said sodium chloride is added with the spore suspension of *Aspergillus niger* and the other part is added directly to the fermentation solution.

3. In a process for the production of citric acid, comprising submerged fermentation of carbohydrate-containing material by means of the fungi *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ions is 1.46 to 7.30:1 and effecting said fermentation in the presence of stainless steel.

4. The process according to claim 3 wherein the presence of said stainless steel during said fermentation is effected by the introduction of a piece of said stainless steel into said nutrient solution.

5. In a process for the production of citric acid, comprising submerged fermentation of carbohydrate-containing material by means of the fungus *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ions is 1.46 to 7.30:1 and adding $$K_4[Fe(CN)_6] \cdot 3H_2O$$

to the fermentation mash as an inhibitor for the growth of the mycelium in amounts of 0.05 to 10 p.p.m.

6. In a process for the production of citric acid, comprising submerged fermentation of carbohydrate-containing material by means of the fungus *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ions is 1.46 to 7.30:1 and effecting said fermentation in the presence of compounds containing nitrogen, said compounds being added to said fermentation medium 24 to 36 hours after inoculation.

7. The process according to claim 6 wherein said compound containing nitrogen comprises ammonium ions.

8. The process according to claim 6 wherein said addition of said compound containing nitrogen is effected 30 hours after inoculation.

9. The process according to claim 1, wherein said nutrient medium is adjusted to a pH value of 2.9.

10. In a process for the production of citric acid, comprising submerged fermentation of carbohydrate-containing material by means of the fungus *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ions is 1.46 to 7.30:1 and effecting said fermentation in the presence of stainless steel, adding $$K_4[Fe(CN)_6] \cdot 3H_2O$$

to the fermetation mash as inhibitor for the growth of the mycelium in amounts of 0.05 to 10 p.p.m. and adjusting said nutrient medium to a pH value of 2.9.

11. In a process for the production of citric acid, comprising submerged fermentation of carbohydrate-containing material by means of the fungus *Aspergillus niger* in a nutrient medium containing alkali ions and phosphate ions the improvement which comprises adjusting the weight ratio of alkali metal ions to $PO_4$ ions to a value of 1.01 to 3.42:1 by adding to said nutrient medium sodium chloride in such an amount that the weight ratio of sodium ions to potassium ion is 1.46 to 7.30:1 and adding caustic soda to the fermenting medium, wherein the first addition of said caustic soda is effected 24 to 36 hours after inoculation.

12. The process according to claim 11, wherein said caustic soda is added gradually in small portions.

References Cited

UNITED STATES PATENTS

| 3,335,067 | 8/1967 | Batti | 195—36 R |
| 3,326,774 | 6/1967 | Gold et al. | 195—36 R |

LIONEL M. SHAPIRO, Primary Examiner